United States Patent
Dougherty

(10) Patent No.: US 11,437,813 B2
(45) Date of Patent: Sep. 6, 2022

(54) SYSTEM CONTROLLER FOR A HYBRID AIRCRAFT PROPULSION SYSTEM

(71) Applicant: Rolls-Royce North American Technologies Inc., Indianapolis, IN (US)

(72) Inventor: Michael P. Dougherty, Indianapolis, IN (US)

(73) Assignee: ROLLS-ROYCE NORTH AMERICAN TECHNOLOGIES INC., Indianapolis, IN (US)

(*) Notice: Subject to any disclaimer, the term of this patent is extended or adjusted under 35 U.S.C. 154(b) by 926 days.

(21) Appl. No.: 16/180,940

(22) Filed: Nov. 5, 2018

(65) Prior Publication Data

US 2020/0140106 A1    May 7, 2020

(51) Int. Cl.
| | |
|---|---|
| B64D 31/02 | (2006.01) |
| B64D 27/24 | (2006.01) |
| H02J 1/14 | (2006.01) |
| H02P 5/46 | (2006.01) |
| H02P 7/00 | (2016.01) |
| H02P 29/40 | (2016.01) |
| H02J 1/10 | (2006.01) |
| H02J 7/14 | (2006.01) |
| B64D 27/10 | (2006.01) |
| B64D 27/02 | (2006.01) |
| H02P 101/30 | (2015.01) |

(52) U.S. Cl.
CPC ............... *H02J 1/14* (2013.01); *B64D 27/24* (2013.01); *B64D 31/02* (2013.01); *H02J 1/106* (2020.01); *H02P 5/46* (2013.01); *H02P 7/00* (2013.01); *H02P 29/40* (2016.02); *B64D 27/10* (2013.01); *B64D 2027/026* (2013.01); *H02J 7/14* (2013.01); *H02J 2310/44* (2020.01); *H02P 2101/30* (2015.01); *Y02T 50/60* (2013.01)

(58) Field of Classification Search
CPC ...... H02J 1/14; H02J 1/106; H02J 7/14; H02J 2310/44; H02P 5/46; H02P 7/00; H02P 29/40; H02P 2101/30; B64D 2027/026; Y02T 50/60

See application file for complete search history.

(56) References Cited

U.S. PATENT DOCUMENTS

| | | | | |
|---|---|---|---|---|
| 5,334,923 A * | 8/1994 | Lorenz | ................... | H02P 21/18 318/807 |
| 6,563,234 B2 * | 5/2003 | Hasegawa | ............... | H02P 9/105 307/66 |
| 8,044,672 B2 | 10/2011 | Williams | | |
| 8,148,842 B2 * | 4/2012 | Maier | ...................... | H02J 4/00 307/9.1 |
| 8,525,489 B2 * | 9/2013 | Ahn | ........................ | H02P 9/102 322/24 |

(Continued)

FOREIGN PATENT DOCUMENTS

JP      3067028 B2    7/2000

*Primary Examiner* — Pedro J Cuevas
(74) *Attorney, Agent, or Firm* — Shumaker & Sieffert, P.A.

(57) ABSTRACT

Control logic for a power sharing system on a hybrid propulsion aircraft, utilizing parallel multiple control loops outputting difference commands which provide bumpless transfer between control loops without integrator wind up or reset logic, allowing for efficient load distribution between electric generators and batteries powering electric motors.

20 Claims, 2 Drawing Sheets

(56) References Cited

U.S. PATENT DOCUMENTS

| | | | |
|---|---|---|---|
| 8,786,262 B2* | 7/2014 | Rajashekara | H02P 21/06 |
| | | | 322/25 |
| 8,912,675 B2* | 12/2014 | Mata Dumenjo | F03D 7/048 |
| | | | 290/34 |
| 9,140,253 B2 | 9/2015 | Wentworth et al. | |
| 9,263,896 B2* | 2/2016 | Kinjo | H02M 3/33592 |
| 9,595,904 B2* | 3/2017 | Lee | H02M 7/5395 |
| 9,853,573 B2 | 12/2017 | Siri | |
| 9,944,167 B2 | 4/2018 | Biderman et al. | |
| 10,038,397 B2* | 7/2018 | Cline | H02K 7/1815 |
| 10,131,441 B2* | 11/2018 | Edwards | B64D 27/24 |
| 10,359,776 B2* | 7/2019 | Chen | G05B 23/0294 |
| 10,421,462 B2* | 9/2019 | Lin | B60W 40/13 |
| 10,483,789 B2* | 11/2019 | Foggia | H02S 40/30 |
| 10,797,485 B2* | 10/2020 | Yamauchi | H02J 9/06 |
| 10,814,999 B2* | 10/2020 | Elliott | H02J 3/14 |
| 10,892,618 B1* | 1/2021 | Cooper | H02J 9/00 |
| 10,985,560 B2* | 4/2021 | Umezu | H02J 3/06 |
| 11,128,245 B2* | 9/2021 | Umezu | H02J 4/00 |
| 2001/0012211 A1* | 8/2001 | Hasegawa | H02P 9/42 |
| | | | 363/131 |
| 2009/0152942 A1* | 6/2009 | Waite | H02J 1/14 |
| | | | 307/9.1 |
| 2013/0027002 A1* | 1/2013 | Rajashekara | H02P 9/305 |
| | | | 322/89 |
| 2013/0234512 A1* | 9/2013 | Kinjo | H02M 3/1588 |
| | | | 307/25 |
| 2014/0062086 A1* | 3/2014 | Mata Dumenjo | H02J 3/1842 |
| | | | 290/44 |
| 2015/0008860 A1* | 1/2015 | Lee | H02M 7/5387 |
| | | | 318/503 |
| 2015/0318705 A1 | 11/2015 | Lucas et al. | |
| 2017/0279376 A1 | 9/2017 | Siri | |
| 2017/0324360 A1* | 11/2017 | Cline | H02J 3/46 |
| 2018/0026443 A1 | 1/2018 | Covic et al. | |
| 2018/0131224 A1* | 5/2018 | Foggia | H02J 7/35 |
| 2018/0239348 A1* | 8/2018 | Chen | G05B 23/0289 |
| 2018/0265209 A1* | 9/2018 | Nfonguem | B64D 35/08 |
| 2019/0109458 A1* | 4/2019 | Yamauchi | H02J 3/38 |
| 2019/0315481 A1* | 10/2019 | Elliott | H02J 3/14 |
| 2020/0083709 A1* | 3/2020 | Umezu | H02P 9/04 |
| 2021/0203258 A1* | 7/2021 | Umezu | H02J 3/48 |

* cited by examiner

SYSTEM CONTROLLER FOR A HYBRID AIRCRAFT PROPULSION SYSTEM

BACKGROUND

A growing development in aircraft propulsion is to employ electrical components to distribute thrust and achieve ultra high effect bypass ratios, as well as other airframe level benefits such as improved lift to drag ratio. This type of distributed electrical propulsion can be supplemented with electrical energy storage. Some of these engine types involve connecting multiple electrically driven propellers to a battery and multiple gas turbine generators, often in a DC microgrid, which allows the battery and generator to share power loading while providing more freedom in operating frequencies than a AC grid would. When multiple sources are providing power to a DC grid care must be taken when balancing power outputs, as the voltage can suddenly change when one of those devices reaches an internal limit, causing it to change how much power it is providing. Communication methods may be too slow to react after the limit is reached, so system-level avoidance is needed. This is especially true for a small microgrid, like a hybrid aircraft propulsion system, because any single device provides a large portion of the grid's power and because capacitance may be low for weight considerations. One example of this is if a battery is approaching its maximum discharge current, voltage would drop suddenly between the time when the battery limits its own current and another device can be commanded to provide current.

Current engine control systems (FADEC) are not designed with hybrid systems in mind and thus do not avoid device limits by offsetting loads at the system level to other sources. As a result, current FADEC's would not be ideal for hybrid aircraft propulsion systems.

It would be advantageous for a supervisory control system to provide power sharing that avoids component operating limits by offsetting loads at the system level.

SUMMARY

A method for controlling power sources in an electrical system which includes receiving data at a system control regarding instantaneous operating parameters of a first power source and a second power source; predetermining data regarding operating limits of the first power source and the second power source; receiving at the system control data regarding a power demand of the electrical system; determining the instantaneous operating parameter of the first power source and the second power source in closest proximity to an operating limit; and, controlling at least one of the first power source or the second power source based on the determination.

In some embodiments the instantaneous operating parameters are prioritized based on potential adverse effects if a limit is exceeded. In other embodiments the power demand of electrical system is an electric motor driving a propeller or fan. In more embodiments the instantaneous operating parameters comprise current, voltage, torque, or speed. In some embodiments the operating limits comprise maximum current, minimum current, maximum torque, minimum torque. In other embodiments the electric motor is powered by both the first power source and the second power source. In more embodiments the first power source is a battery and normally operates at a first reference rate. In even other embodiments the battery acts as a voltage regulator. In yet other embodiments the battery normally accounts for fast transient loads. Yet in even other embodiments the second power source is an electric generator and normally accounts for sustained load changes. In some embodiments the first power source and the second power source are generators.

A method for controlling two or more power sources in an electrical system may include receiving data at a system control regarding instantaneous operating parameters of the two or more power sources; predetermining data regarding operating limits of each of the two or more power sources; determining for each of the two or more power sources a relative margin between the received data and the predetermined data, ranking the two or more powers sources as a function of the relative margins; receiving the system control, a change in power demand of the electrical system, and selecting one of the two or more power sources based on the ranking and controlling the one of the two or more power sources in response to the change in power demand.

In some embodiments at least one of the two or more power sources is an electric generator. In yet other embodiments at least one of the two or more power sources is a battery. Yet in some embodiments the instantaneous operating parameters comprise battery current, battery voltage, generator torque, generator current, generator voltage, generator speed. In yet other embodiments the operating limits comprise maximum battery current, minimum battery current, maximum generator torque, minimum generator torque. In other embodiments an electric motor is powered by all of the two or more power sources. Yet in other embodiments the battery normally operates at a reference rate. I some embodiments the battery is preferentially chosen to regulate voltage and and supply power for fast transient loads when all of the two or more power sources have large relative margins. In other embodiments the electric generator is preferentially chosen to supply power for sustained load changes, when all of the two or more power sources have large relative margins.

A method for controlling power supplies in an electrical system having a battery, an electric generator, and an electric motors may include receiving data at a system control regarding instantaneous operating parameters of the battery and the electric generator; predetermining data regarding operating limits of the battery and electric generator; receiving at the system control data regarding a power demand of the electrical system; dividing the instantaneous operating parameters into control loops; assigning a priority to each control loop; determining a limiting instantaneous operating parameter of the battery and electric generator by proximity to a limit within a control loop assigned the lowest priority; comparing the limiting instantaneous operating parameter to an operating parameter of each successive higher priority control loop for proximity to a limit; determining a controlling operating parameter based on the comparison; and, sending a command to control the electric generators or battery to output power to meet the power demand based on the determination.

BRIEF DESCRIPTION OF THE DRAWINGS

The following will be apparent from elements of the figures, which are provided for illustrative purposes.

Figure 1:
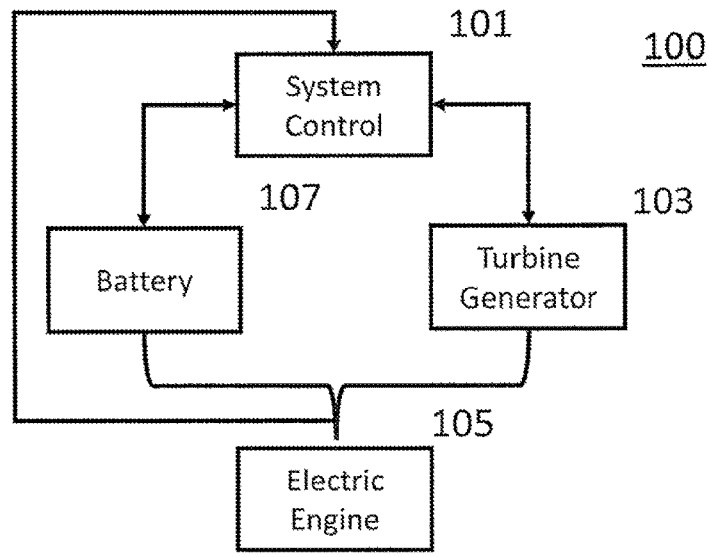
FIG. 1 depicts a basic load sharing system diagram.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

The present disclosure is directed to systems and methods for power sharing within a hybrid power airplane.

Power Sharing system shown in FIG. 1 uses two or more power sources, typically a battery or electrical storage system to control voltage and power an electric engine. A turbine generator provides power to share loading demanded by the electric engine. The system controller 101 receives feedback from the turbine generators, battery and load, compares the feedback against reference values and uses the most limiting result to generate commands to control the output of the turbine generators and battery.

During steady operations the battery may act as the voltage regulator of the system and may vary its output for small fast transient load fluctuations. Otherwise the battery may operate at a predetermined reference rate for steady-state operations. Large or sustained load changes may be handled by the turbine generators, allowing the battery to remain at or near its reference rate. This may continue until the load drops or the turbine nears an operating limit at which point battery output power may increase to prevent the limit being reached.

If the battery trends towards an operating limit or away from its reference rate, loading may be shifted to the turbine generator to ensure the battery can return to its reference rate and not exceed a limit even if there is no change in load. The operating limits are arranged in a hierarchy to ensure load sharing is offset prior to reaching a limit.

Figure 2:
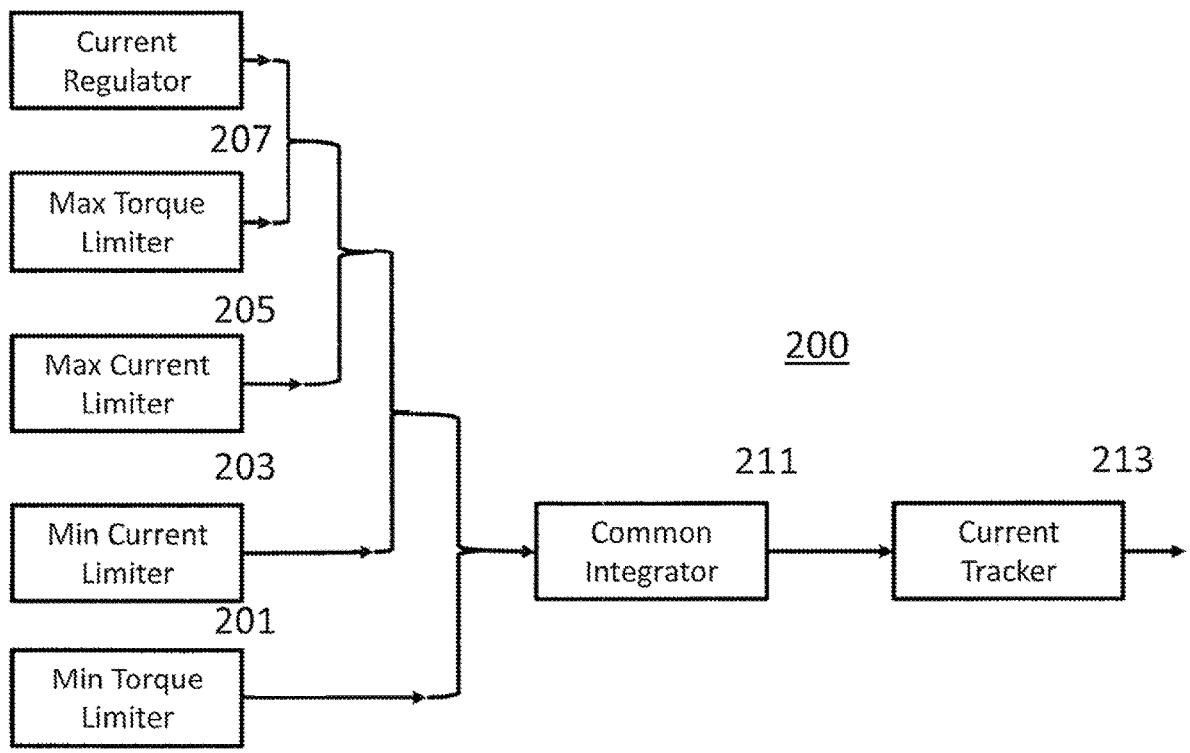
FIG. 2 depicts a flow chart of the control loop hierarchy.

FIG. 2 depicts the hierarchy of multiple control loops used by the system controller 101, here five are depicted. A control loop may output a difference command as a function of the proximity to a limit. This difference command can be used by a common integrator to produce a demand signal.

The priorities within the hierarchy are based on potential adverse effects, as well as ensuring controlling for one limit will not cause the system to exceed another. The minimum torque limit is the highest priority as it acts to prevent reversing of the generator torque causing them to motor against engine power which can have an impact on shaft life, and is compared to the most limiting case of the other four control loops. The minimum current limit is the next highest priority as it acts to prevent large voltage drops from the battery limiting its current, and is compared to the most limiting case between the max current limiter, the max torque limiter, and the current regulator. The max current limiter's priority is just below the minimum current limiter as it helps to avoid a limit that would result in the power storage self limiting the current to prevent overcharging, and is compared to the most limiting case between the max torque limiter and the current limiter, the two nominal operating states of the system. The max torque limiter is a higher priority than the current regulator and acts in a predictive manner allowing the battery to take on loads which may cause the engines to exceed torque limits. This torque limit may also be set artificially low to prevent overuse of the engine, improving fuel burn or engine life.

The current regulator is the lowest priority and the normal mode of operation raising and lowering generator torque to provide a baseline load sharing between the battery and generators. The current regulator is normally set to produce zero battery current, neither charging nor discharging. Either the current regulation setpoint or engine torque limit can be varied to produce battery charging or discharging current. The common integrator receives inputs from various control loops and based on the hierarchy passes on the appropriate current reference to the current tracking control loop. The current tracking control loop may send commands to the generators, engine, and/or battery to increase or decrease generator torque, generator current, or battery current.

Figure 3:
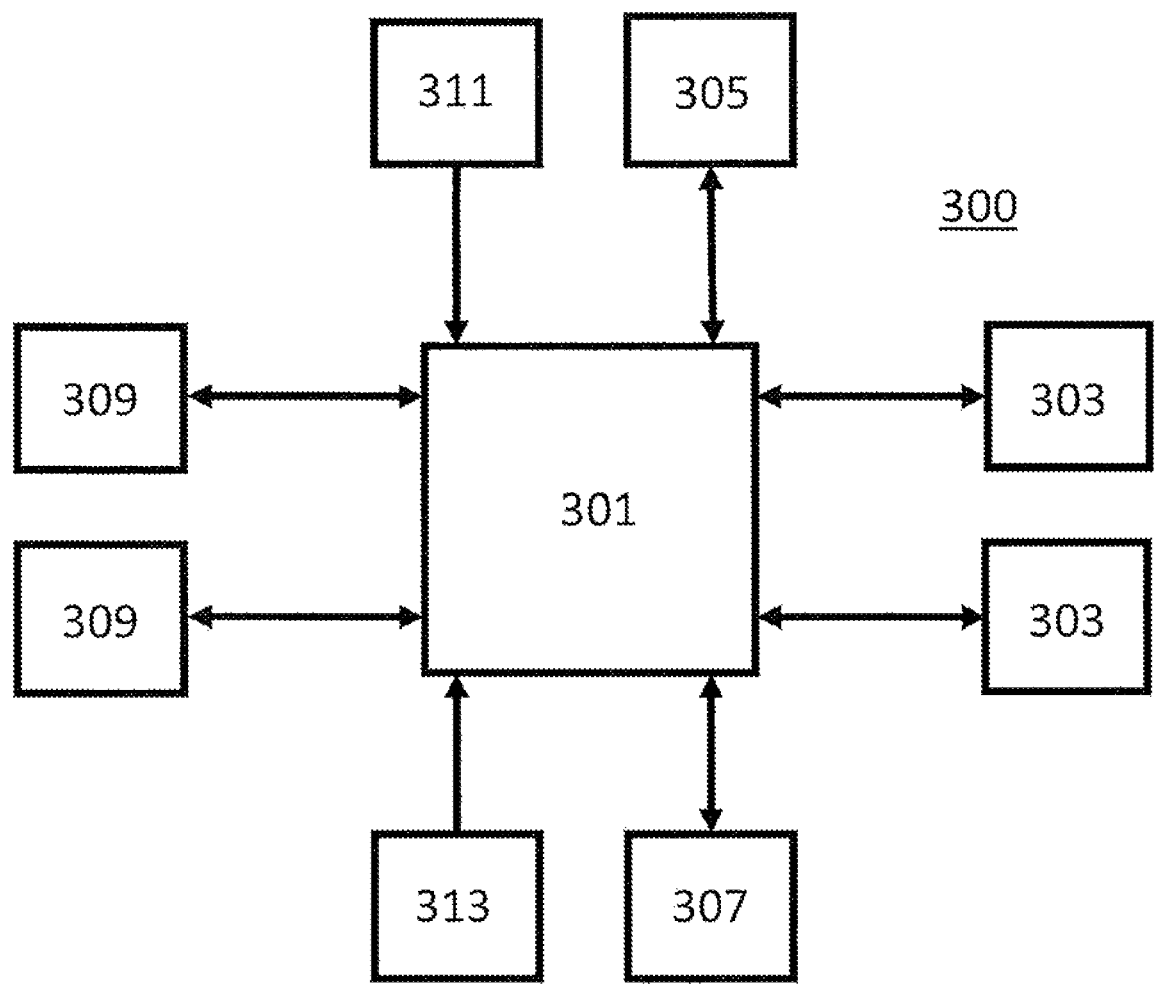
FIG. 3 depicts a diagram of information flow of the load sharing system.

FIG. 3 depicts a system diagram according to an embodiment of the disclosure. Rectifiers 303 may provide torque control of the generators. Inverters 309 may provide speed control of the motors. Both inverters 309 and rectifiers 303 may provide data to the system controller 301, such data may contain voltage, current, torque, speed and status. The system controller 301 may provide data to the rectifiers which may include power, operating mode, torque reference, network management, error checking, and active discharge. To the inverters 309, the system controller 301 may provide data including power, operating mode, speed reference, network management, error checking, and active discharge. The operator interface 311 may provide data to the system controller 301 which may include engine torque limits, and operating commands such as shutdown and emergency stop. The system controller 301 may provide status and to the operator interface 311. An insulation monitoring device (IMD) 313 may be used to detect ground faults and may provide the system control with data including measured resistances. The system controller 301 may receive inputs from an Electronic Engine Controller (EEC) 305 which may provide engine speed control. The EEC 305 may provide data to the system control which may include output torque, gas turbine speed, power turbine speed, and status. The Energy Storage System (ESS) 307 may provide voltage control and provide power for fast transient loads. The ESS 307 may send data to the system controller 301 which may include voltage, current, status, and current limits. The system control may provide to the ESS 307 operating mode, contactor commands, shutdown and emergency stop.

Although depicted as two, the system may accommodate multiple rectifiers 303 and inverters 309 each set associated with an exclusive turbine generator, thus allowing the generators to operate with different operating conditions. The system may operate in series, parallel, or turbo-electric modes. The system may be expanded to monitor propeller pitch, turbulence, air bursts, and hotel loads.

Other embodiments of the system may use additional control loops including component temperatures and battery state of charge.

Some embodiments of the system may include parallel hybrid operation, in which the machines attached to the engine shaft (103, 303) are used as motors (adding their torque to that of the engine to drive a load on the shaft, normally a prop or fan). This mode generally doesn't use any additional motors-driven props (309) since the engine is not producing any electrical power. In some embodiments the power sharing may be between multiple batteries and/or multiple generators per engine and/or multiple engines. Some embodiments may perform a to turbo-electric operation, in which there is no battery in the system. This would entail using shifting power shared between multiple generators and/or engines.

Although examples are illustrated and described herein, embodiments are nevertheless not limited to the details shown, since various modifications and structural changes may be made therein by those of ordinary skill within the scope and range of equivalents of the claims.

What is claimed is:

1. A method for controlling power sources in an electrical system, the method comprising:
   receiving, by a system controller, instantaneous operating parameters of a first power source and instantaneous operating parameters of a second power source,
      wherein an electric load is configured to receive electrical power from the first power source and the second power source, and
      wherein the first power source and the second power source are configured to share an amount of the electrical power to the electric load;
   comparing, by the system controller, the received instantaneous operating parameters to respective operating limits of the first power source and of the second power source, wherein the respective operating limits are arranged in a hierarchy of respective priority levels;
   generating, by the system controller, commands to control an amount of electrical power output by at least one of the first power source or the second power source based at least on both:
      the comparison of the instantaneous operating parameters to the respective operating limits; and
      the respective priority level of the respective operating limit.

2. The method of claim 1, further comprising:
   determining, by the system controller, respective margins between:
      each respective instantaneous operating parameter of the instantaneous operating parameters; and
      each respective operating limit associated with the respective instantaneous operating parameter; and
   generating, by the system controller, the commands based on which respective instantaneous operating parameter is closest to the associated respective operating limit.

3. The method of claim 1, further comprising receiving, by the system controller, data from the electric load regarding a power demand of the electric load, wherein the electric load comprises an electric motor driving a propeller or fan.

4. The method of claim 1, wherein the instantaneous operating parameters comprise one or more of current, voltage, torque, or speed.

5. The method of claim 1, wherein the operating limits comprise maximum current, minimum current, maximum torque, minimum torque.

6. The method of claim 5, wherein the hierarchy of respective priority levels is:
   first priority—minimum torque;
   second priority—minimum current;
   third priority—maximum current; and
   fourth priority—maximum torque.

7. The method of claim 1, wherein the first power source is a battery.

8. The method of claim 7, wherein the battery performs functions of a voltage regulator for transient changes in power demand of the electric load.

9. The method of claim 8, further comprising:
   receiving, by the system controller, an operating temperature for a component of the electric system;
   comparing, by the system controller, the operating temperature to a temperature limit, wherein the temperature limit is an operating limit of the operating limits arranged in the hierarchy of respective priority levels; and
   generating, by the system controller, the commands based on the comparison of the operating temperature to the temperature limit.

10. The method of claim 9, wherein the second power source is an electric generator.

11. The method of claim 1, wherein the first power source and the second power source are electric generators.

12. An electrical system comprising:
   two or more sources of electrical power;
   an electrical load configured to receive the electrical power from the two or more power sources, wherein the two or more power sources are configured to share an amount of the electrical power to the electric load; and
   a system controller configured to:
      receive instantaneous operating parameters of the two or more power sources;
      compare the received instantaneous operating parameters to respective operating limits of each of the two or more power sources, wherein the respective operating limits are arranged in a hierarchy of respective priority levels; and
      select one of the two or more power sources to control based at least on both:
         the comparison of the instantaneous operating parameters to the respective operating limits; and
         the respective priority level of the respective operating limit;
      generate commands to control the selected power source.

13. The system of claim 12, wherein the at least one of the two or more power sources is an electric generator.

14. The system of claim 13, wherein at least one of the two or more power sources is a battery.

15. The system of claim 14, wherein the instantaneous operating parameters comprise battery current, battery voltage, generator torque, generator current, generator voltage, generator speed.

16. The system of claim 14, wherein the operating limits comprise maximum battery current, minimum battery current, maximum generator torque, minimum generator torque.

17. The system of claim 12, wherein the electric load comprises an electric motor.

18. The system of claim 12, wherein the system controller is further configured to:
   determine respective margins between:
      each respective instantaneous operating parameter of the instantaneous operating parameters; and
      each respective operating limit associated with the respective instantaneous operating parameter; and
   generate the commands based on which respective instantaneous operating parameter is closest to the associated respective operating limit.

19. The system of claim 12, wherein the system controller is further configured to:
   receive an indication of a change in power demand of the electrical load;
   select one of the two or more power sources to control based on the change in power demand; and
   generate commands to control the selected power source.

20. A method for controlling power supplies in an electrical system having an electric motor, the power supplies including a battery and an electric generator, the method comprising:
- receiving, by a system controller, instantaneous operating parameters of the battery and the electric generator,
  - wherein the electric motor is configured to receive electrical power from the battery and the electric generator, and
  - wherein the battery and the electric generator are configured to share an amount of the electrical power to the electric load;
- comparing, by the system controller, the received instantaneous operating parameters to respective operating limits of the battery and electric generator, wherein the respective operating limits are arranged in a hierarchy of respective priority levels;
- generating, by the system controller, commands to control at least one of the electric generator or the battery based at least on both:
  - the comparison of the instantaneous operating parameters to the respective operating limits; and
- the respective priority level of the respective operating limit.

\* \* \* \* \*